United States Patent
Ambikapathi et al.

(10) Patent No.: US 11,455,528 B2
(45) Date of Patent: Sep. 27, 2022

(54) AUTOMATED OPTICAL INSPECTION AND CLASSIFICATION APPARATUS BASED ON A DEEP LEARNING SYSTEM AND TRAINING APPARATUS THEREOF

(71) Applicant: UTECHZONE CO., LTD., New Taipei (TW)

(72) Inventors: Arulmurugan Ambikapathi, New Taipei (TW); Chien-Chung Lin, New Taipei (TW); Cheng-Hua Hsieh, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 762 days.

(21) Appl. No.: 16/455,243

(22) Filed: Jun. 27, 2019

(65) Prior Publication Data
US 2020/0005141 A1 Jan. 2, 2020

(30) Foreign Application Priority Data
Jun. 29, 2018 (TW) .................. 107122640

(51) Int. Cl.
*G06N 3/08* (2006.01)
*G01N 21/01* (2006.01)
*G06N 20/00* (2019.01)

(52) U.S. Cl.
CPC ............... *G06N 3/08* (2013.01); *G01N 21/01* (2013.01); *G06N 20/00* (2019.01)

(58) Field of Classification Search
CPC .......... G06N 3/08; G06N 20/00; G01N 21/01
See application file for complete search history.

(56) References Cited

FOREIGN PATENT DOCUMENTS

| CN | 108319972 A | * | 7/2018 | ............. G06K 9/342 |
| CN | 109389667 A | * | 2/2019 | ........... G06N 3/0454 |
| CN | 110533041 A | * | 12/2019 | ............. G06K 9/325 |

* cited by examiner

*Primary Examiner* — David P Porta
*Assistant Examiner* — Fani Polyzos Boosalis
(74) *Attorney, Agent, or Firm* — Muncy, Geissler, Olds & Lowe, P.C.

(57) ABSTRACT

The present invention provides an automated optical inspection and classification apparatus based on a deep learning system, comprising a camera and a processor. The processor executes a deep learning system after loading data from a storage unit and the processor, and comprises an input layer, a neural network layer group, and a fully connected-layer group. The neural network layer group is for extracting to an input image and thereby obtaining a plurality of image features. The fully connected-layer group is for performing weight-based classification and outputting an inspection result.

14 Claims, 5 Drawing Sheets

AUTOMATED OPTICAL INSPECTION AND CLASSIFICATION APPARATUS BASED ON A DEEP LEARNING SYSTEM AND TRAINING APPARATUS THEREOF

BACKGROUND OF THE INVENTION

1. Technical Field

The present invention relates to an automated optical inspection and classification apparatus and a training apparatus thereof. More particularly, the invention relates to an automated optical inspection and classification equipment based on a deep learning system and to a training apparatus of the automated optical inspection and classification apparatus.

2. Description of Related Art

Deep learning has various applications, the most common examples of which are image recognition, speech recognition, and natural language processing. In fact, deep learning has been applied to almost every field that is related to our daily lives, even including recommender systems and biomedical informatics. Image recognition, in particular, is the area in which deep learning has been used the most extensively and reached the highest technical maturity.

To prevent human errors in optical inspection, artificial intelligence and machine learning are typically used in place of visual inspection to minimize misjudgment. Currently, the development trend of artificial neural networks is to increase the network depth as a way to improve classification accuracy. However, a vast number of experiment results have shown that simply increasing the depth of an artificial neural network does not enhance, but rather lowers, classification accuracy in the end, one possible reason being that an increase in depth of an artificial neural network trained by backpropagation may add to the difficulty of convergence, and that front-end neural network layers have greater impact on inspection results than distal neural network layers. Moreover, merely increasing the depth of an artificial neural network will reduce the speed and efficiency of inspection, so higher hardware performance is required to accelerate operation of the artificial neural network. In light of the above, there is need to improve the existing artificial neural network structures.

BRIEF SUMMARY OF THE INVENTION

The primary objective of the present invention is to solve the problem that an increase in depth of an artificial neural network tends to hinder convergence of the training process and lower computation efficiency.

To achieve the foregoing objective, the present invention provides a deep learning system-based automated optical inspection and classification apparatus for inspecting an object for defects through an image of the object under inspection. The automated optical inspection and classification apparatus includes a processor connected to a camera. The camera takes the image of the object into an input image under inspection. The processor executes the deep learning system after loading data from a storage unit. The deep learning system includes: an input layer for receiving and normalizing the image of the object into an input image; a neural network layer group for extracting the input image and thereby obtaining a plurality of image features, wherein the neural network layer group includes at least one neural network sub-block layer and a max-pooling layer; and a fully connected-layer group with at least one fully connected layer for performing weight-based classification and outputting an inspection result; wherein the neural network sub-block layer includes: a first operational subset and a second operational subset that share a common input, an element-wise (eltwise) layer for performing a residual-related operation on an output of the first operational subset and an output of the second operational subset, and a rectified linear unit (ReLU) for performing a nonlinear operation on an output of the eltwise layer.

Another objective of the present invention is to provide a training apparatus for a deep learning system, wherein the training apparatus includes an automated visual inspection (AVI) device and the foregoing automated optical inspection and classification apparatus. The AVI device inspects an object under inspection and generates a defect image and related defect information, which includes the type and location of a defect. The automated optical inspection and classification apparatus obtains the defect image from the AVI device and transmits the defect image to the deep learning system in order to train the deep learning system.

Multiple test results have shown that the present invention not only can increase the defect detection rate and accuracy rate of automated optical inspection effectively, but also provides an improved artificial neural network structure that enables a significant increase in inspection speed and hence improvement on the result and efficiency of defect detection.

DETAILED DESCRIPTION OF THE INVENTION

The details and technical solution of the present invention are hereunder described with reference to accompanying drawings.

The present invention is applied to an automated optical inspection and classification apparatus that performs surface defect detection on semiconductor chips, wafers, workpieces, display panels, circuit boards (e.g., printed circuit boards, flexible printed circuit boards, and ceramic circuit boards), or the like.

Figure 1:
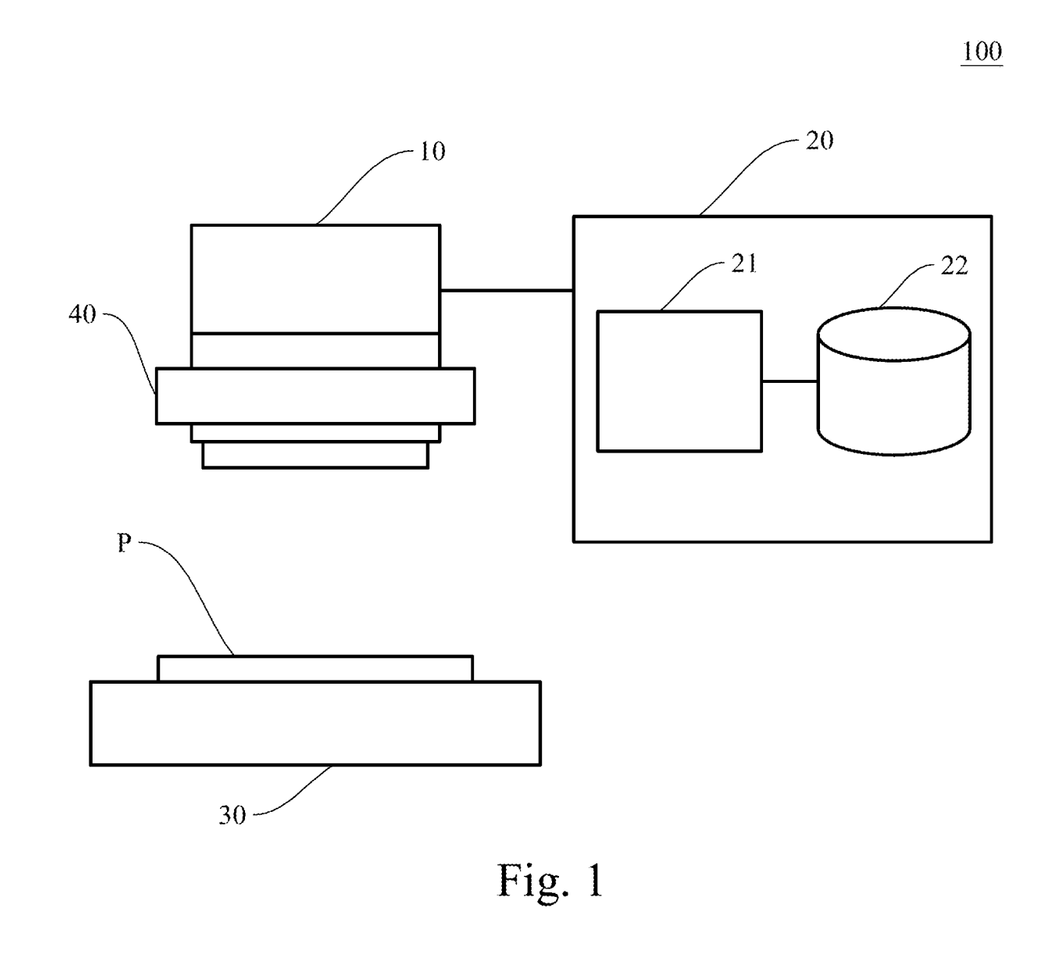
FIG. 1 is a block diagram of the automated optical inspection and classification apparatus according to an embodiment of the present invention.

Please refer to FIG. 1 for a block diagram of the automated optical inspection and classification apparatus according to an embodiment of the present invention. The structure of the apparatus is detailed below.

As shown in FIG. 1, the automated optical inspection and classification apparatus 100 essentially includes a camera 10 and an image processing device 20 connected to the camera 10. To enable fully automated inspection and fully automated control, a carrier 30 is generally also provided to carry an object P to an inspection area where images of the object P will be taken. As the type of the object P and those of the defects to be detected may vary, the automated optical inspection and classification apparatus 100 may be mounted with various auxiliary light sources 40 for illuminating the object P under inspection. Such auxiliary light sources 40 include lamps for emitting collimated light, lamps for emitting diffused light, dome lamps, and so on. Two or more auxiliary light sources 40 may be required at the same time, depending on the type of the object P under inspection.

The camera 10 for automated optical inspection is selected according to practical needs. A high-precision camera is called for when certain requirements are imposed on the precision and reliability of the workpiece to be inspected. Conversely, a low-end camera may be used to reduce equipment cost. In short, the choice of the camera is at the user's discretion. The camera 10 can be generally categorized as an area scan camera or a line scan camera, either of which can be used to meet practical needs. A line scan camera is often used for dynamic inspection, by which the object P under inspection, for example, is photographed while moving. Dynamic inspection ensures continuity of the inspection process.

The camera 10 is connected to the backend image processing device 20. Images taken by the camera 10 are analyzed by the image processing device 20 in order to find defects on the surface of the object P under inspection. Preferably, the camera 10 is provided with a microprocessor (generally a built-in feature of the camera 10) for controlling the camera 10 or preprocessing images taken by the camera 10. The image processing device 20 obtains images via the camera 10 (or its microprocessor), preprocesses the images (e.g., through image enhancement, noise removal, contrast enhancement, edge enhancement, feature extraction, image compression, and image conversion), outputs the preprocessed images, and thereby subjects the images to analysis by a visual software tool and algorithm to produce a determination result, which is either output or stored in a database. The image processing device 20 is loaded with a deep learning system in order to perform image recognition. The image processing device 20 includes a processor 21 and a storage unit 22 connected to, or co-structured with, the processor 21. The processor 21 executes the deep learning system of the present invention with data loaded from the storage unit 22.

When automated optical inspection is carried out, dust and defects on the object P under inspection tend to be mistaken for each other, whether they are detected by the human eye or by machine vision. This is mainly because dust and defects are both defined in machine vision as noise with respect to a master slice. While there are differences between the properties of dust and those of a defect (e.g., a typical dust particle is three-dimensional and protrudes from the surface of a master slice, whereas a defect such as a scratch or a bright sub-pixel is generally located in the surface of, or inside, a master slice), both dust and defects are regarded in common machine vision as something different from a master slice, making it difficult to tell dust and defects apart using a general recognition logic. One conventional solution involves logic programming by a software engineer according to common defect features, loading the logic into an AVI device, and once a defect is detected, visually inspecting the defect by an optical inspector for verification. In cases of mass production, however, visual inspection is not as efficient, reliable, and hence suitable as machine vision, given that tens of thousands of products may be manufactured per hour.

Figure 2:
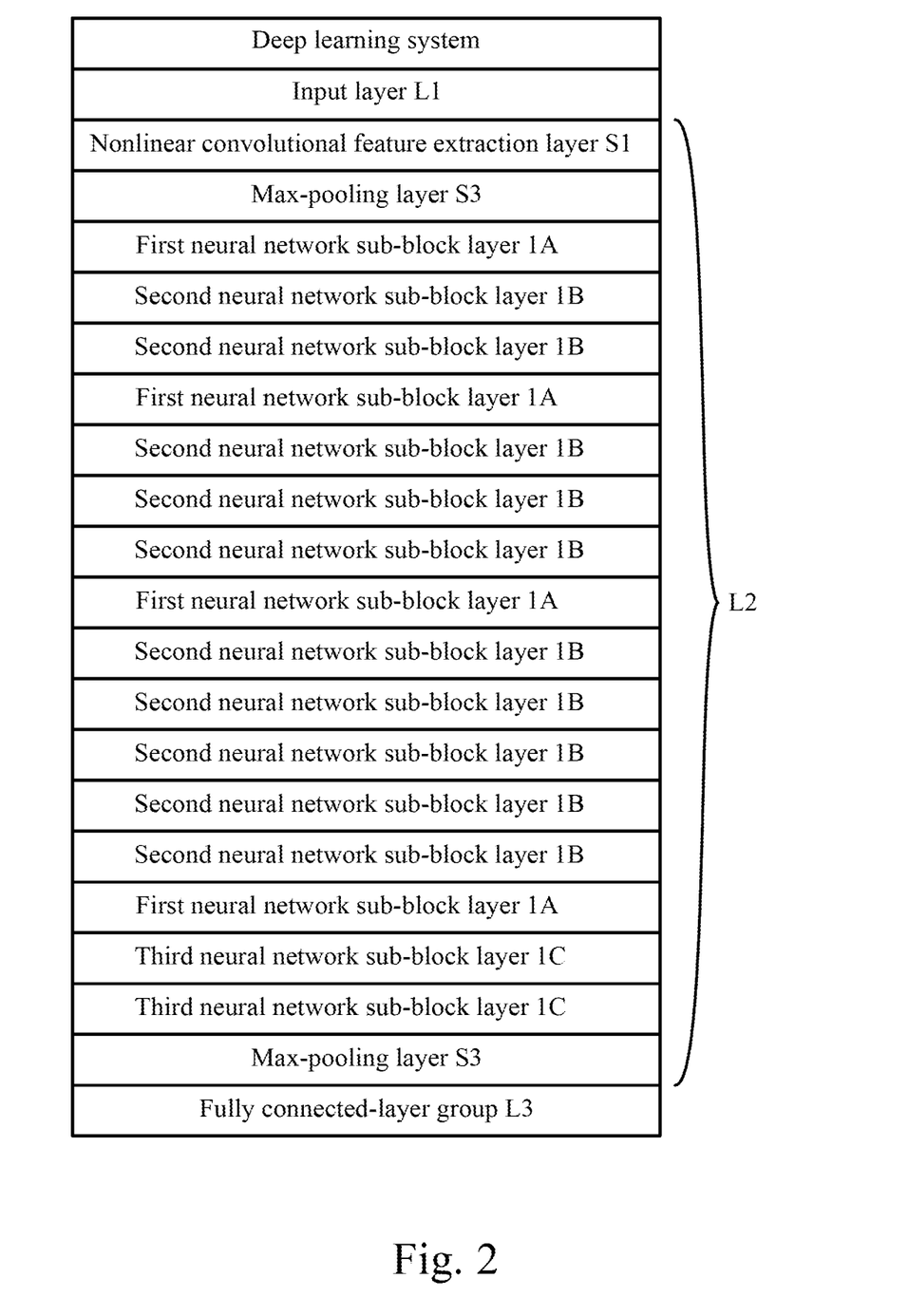
FIG. 2 is a structural diagram (I) of the deep learning system of the invention.
Figure 3:
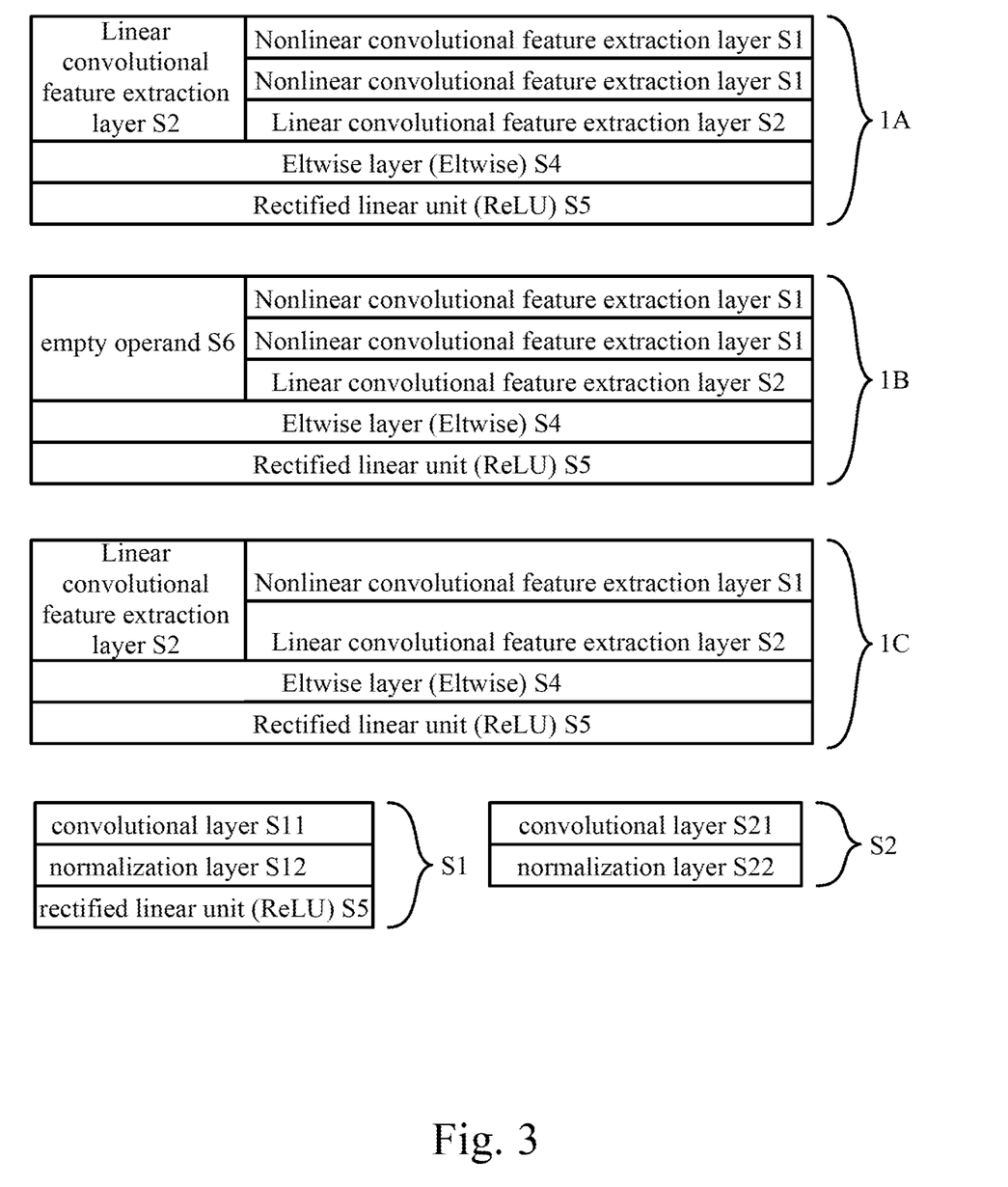
FIG. 3 is a structural diagram (II) of the deep learning system of the invention.

The following paragraphs describe the deep learning system of the present invention in more detail with reference to a preferred embodiment in conjunction with FIG. 2 and FIG. 3, which are structural diagrams (I) and (II) of the deep learning system of the invention.

As shown in FIG. 2, the deep learning system according to this embodiment essentially includes, sequentially in an input-to-output direction, an input layer L1, a neural network layer group L2, and a fully connected-layer group L3. The input layer L1 is configured for receiving an image of the object into an input image and normalizing the image of the object into an input image received. The neural network layer group L2 is configured for extracting on an input image and thereby obtaining a plurality of image features. The neural network layer group L2 includes one or a plurality of neural network sub-block layers (1A, 1B, 1C) and a max-pooling layer S3. One of the neural network sub-block layers or each of some of the neural network sub-block layers includes a first operational subset and a second operational subset that share a common input, an eltwise layer (ELtwise) S4 for performing a residual-related operation on the outputs of the first and the second operational subsets, and a ReLU S5 for performing a nonlinear operation on the output of the eltwise layer S4. The fully connected-layer group L3 includes one or a plurality of fully connected layers for performing weight-based classification and outputting an inspection result.

Referring to FIG. 3, the convolutional neural network layers disclosed in this embodiment essentially include the following five types of sub-blocks: first neural network sub-block layer 1A, second neural network sub-block layer 1B, third neural network sub-block layer 1C, nonlinear convolutional feature extraction layer S1, and linear convolutional feature extraction layer S2. The structure of each of the five types of sub-block layers is detailed as follows.

The first neural network sub-block layer 1A essentially includes a first operational subset and a second operational subset that share a common input, an eltwise layer S4 for performing a residual-related operation on the outputs of the first and the second operational subsets, and a ReLU S5 for performing a nonlinear operation on the output of the eltwise layer S4. The first operational subset includes a linear convolutional feature extraction layer S2 (regarded as a first convolutional neural unit). The second operational subset includes, sequentially in an input-to-output direction, two linear convolutional feature extraction layers S1 (regarded as a second convolutional neural unit) and a nonlinear convolutional feature extraction layer S2 (regarded as a third convolutional neural unit). Each nonlinear convolutional feature extraction layer S1 includes a convolutional layer S11 for feature extraction, a normalization layer S12 for performing batch normalization by computing the squares or variance of the extracted features, and a ReLU S5 for performing a nonlinear operation on the normalized features. Each linear convolutional feature extraction layer S2 includes a convolutional layer S21 for feature extraction and a normalization layer S22 for performing batch normalization by computing the squares or variance of the extracted features. Inserting ReLUs into a convolutional neural network helps lower parameter dependency and reduce overfitting.

The second neural network sub-block layer 1B essentially includes a first operational subset and a second operational subset that share a common input, an eltwise layer S4 for performing a residual-related operation on the outputs of the first and the second operational subsets, and a ReLU S5 for performing a nonlinear operation on the output of the eltwise layer S4. The first operational subset of the second neural network sub-block layer 1B is an empty operand S6, which performs no other operation than outputting its input directly to the eltwise layer S4. The second operational subset of the second neural network sub-block layer 1B includes, sequentially in an input-to-output direction, two nonlinear convolutional feature extraction layers S1 and a linear convolutional feature extraction layer S2.

The third neural network sub-block layer 1C essentially includes a first operational subset and a second operational subset that share a common input, an eltwise layer S4 for performing a residual-related operation on the outputs of the first and the second operational subsets, and a ReLU S5 for performing a nonlinear operation on the output of the eltwise layer S4. The first operational subset of the third neural network sub-block layer 1C includes a linear convolutional feature extraction layer S2 (regarded as a first convolutional neural unit). The second operational subset of the third neural network sub-block layer 1C includes a nonlinear convolutional feature extraction layer S1 (regarded as a second convolutional neural unit) and a linear convolutional feature extraction layer S2 (regarded as a third convolutional neural unit).

Referring back to FIG. 2, the deep learning system of this embodiment is arranged in the following order in an input-to-output direction: input layer L1→nonlinear convolutional feature extraction layer S1→max-pooling layer S3→first neural network sub-block layer 1A→second neural network sub-block layer 1B→second neural network sub-block layer 1B→first neural network sub-block layer 1A→second neural network sub-block layer 1B→second neural network sub-block layer 1B→second neural network sub-block layer 1B→first neural network sub-block layer 1A→second neural network sub-block layer 1B→second neural network sub-block layer 1B→second neural network sub-block layer 1B→second neural network sub-block layer 1B→first neural network sub-block layer 1A→third neural network sub-block layer 1C→third neural network sub-block layer 1C→max-pooling layer S3→fully connected-layer group L3, wherein recurrent sub-blocks are sub-blocks of the same structural definition rather than the same sub-block repeating a loop of operation.

The eltwise layer S4 serves mainly to perform the operation of $H(X)=F(X)+X$, where: X is the output of the first operational subset, F(X) is the output of the second operational subset, and H(X) is the output of the eltwise layer. In another embodiment, the eltwise layer S4 performs the operation of $H(X)=F(X)-X$, where: X is the output of the first operational subset, F(X) is the output of the second operational subset, and H(X) is the output of the eltwise layer. The eltwise layer provides a shortcut to the formation of a feedforward neural network and thereby reduces the difficulty of convergence during backpropagation training.

The fully connected-layer group L3 outputs a classification result (e.g., the type of a defect) through a normalization output layer. In this embodiment, the output of the fully connected-layer group L3 may include a plurality of different defect types to enable further classification of an NG product. For example, the output of the fully connected-layer group L3 regarding a printed circuit board (PCB) under inspection may include a scratch classification result, a short-circuit classification result, a copper-exposure classification result, an indentation classification result, a foreign-matter classification result, an open-circuit classification result, and a defect-free classification result. If the object under inspection is a display panel, the output of the fully connected-layer group may include a lack-of-photospacer (PS) classification result, a sandy-foreign-matter classification result, a foreign-matter-on-film classification result, a foreign-matter-under-film classification result, and a defect-free classification result. If the object under inspection is a flexible printed circuit (FPC) board, the output of the fully connected-layer group may include a small-board-defect classification result, a foreign-matter-on-finger classification result, a compression and bending damage classification result, a breakage classification result, a foreign-matter-on-pad classification result, a U-shaped-metal-surface classification result, and a defect-free classification result. Depending on inspection requirements, the configuration of the fully connected-layer group L3 may be adjusted to output the desired number of classification results.

The present invention further provides a training system for training a deep learning system in an automatic or semi-automatic manner in order to increase the accuracy of the deep learning system. The training system is detailed below with reference to FIG. 4, which is a block diagram of the training system of the invention.

Figure 4:
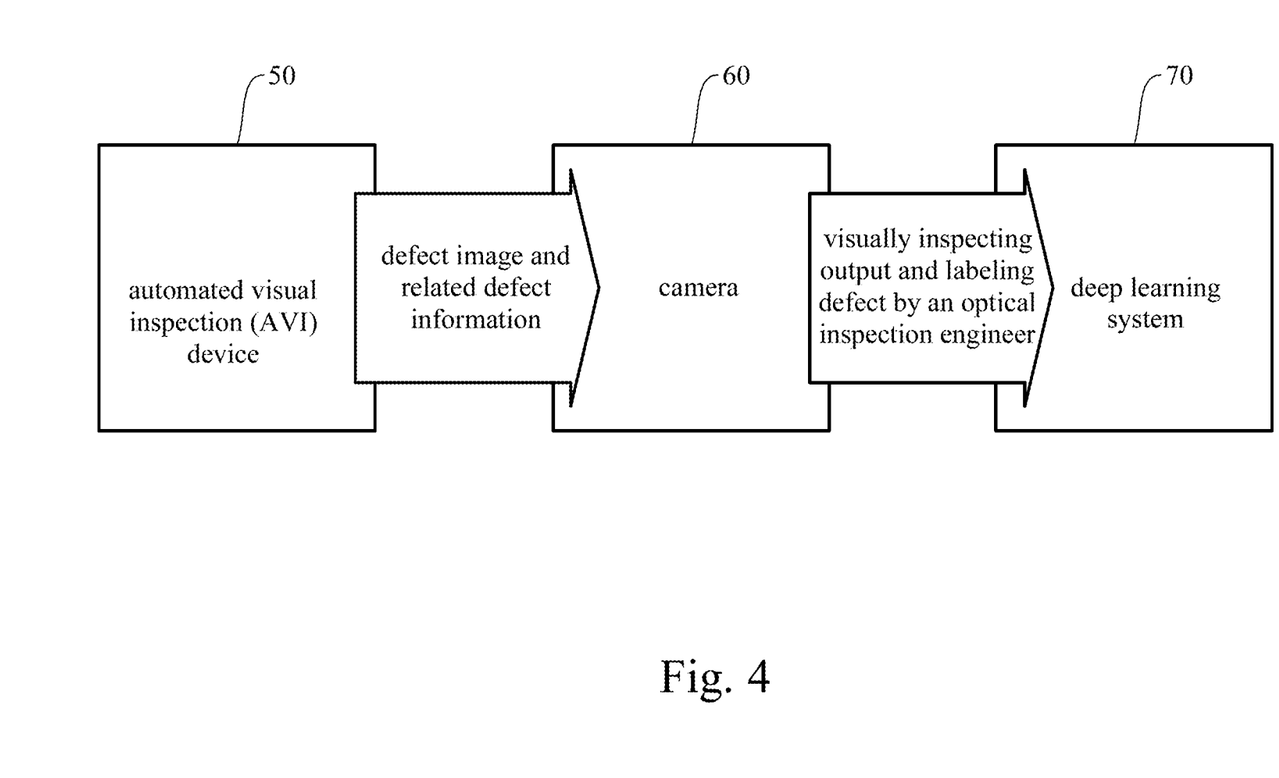
FIG. 4 is a block diagram of the training system of the invention.

In the embodiment shown in FIG. 4, the training apparatus essentially includes an AVI device 50, a camera 60, and the foregoing deep learning system 70-based automated optical inspection and classification apparatus 100.

The AVI device 50 takes an image of an object under inspection through a camera, obtains from this image a defect image and related defect information such as a defect type and a defect location, and outputs the defect image and the related defect information to the camera 60.

The camera 60 is coupled to the AVI device 50, receives the defect image and the related defect information from the AVI device 50, and takes an image of the object according to the defect information to enhance the defect feature of the object, thereby generating a defect-enhanced image. More specifically, the camera 60 can take an image of the defect of the object while illuminating, and thus enhancing, the defect of the object using a stationary or automatically movable auxiliary light source.

The output of the camera 60 is visually inspected by an optical inspection engineer to ensure the accuracy of the master-slice image sample to be used for training, lest the deep learning system learn from an erroneous sample. The defect in the image can be further labeled by the optical inspection engineer or an image processing device. The visual inspection process, however, can be replaced by verification with machine vision. For example, once the AVI device 50 generates an image of the object under inspection and related defect information, the image and the related defect information can be transmitted directly to the camera 60, in order for the camera 60 to photograph the object under inspection while enhancing the image feature of the defect. The resulting defect image is subsequently standardized by an image processing device (e.g., by dividing the defect area into standard-size images) to facilitate training of the deep learning system 70.

The aforesaid defect image can be input into the deep learning system along with other defect images, defect-free images, or other sample images of the master slice, in batches. During the training process, a classification result is deemed accurate when matching the anticipated result and is deemed an error when not. In the latter case, the weight of each layer of the deep learning system will be adjusted by backpropagation of the error values.

Figure 5:
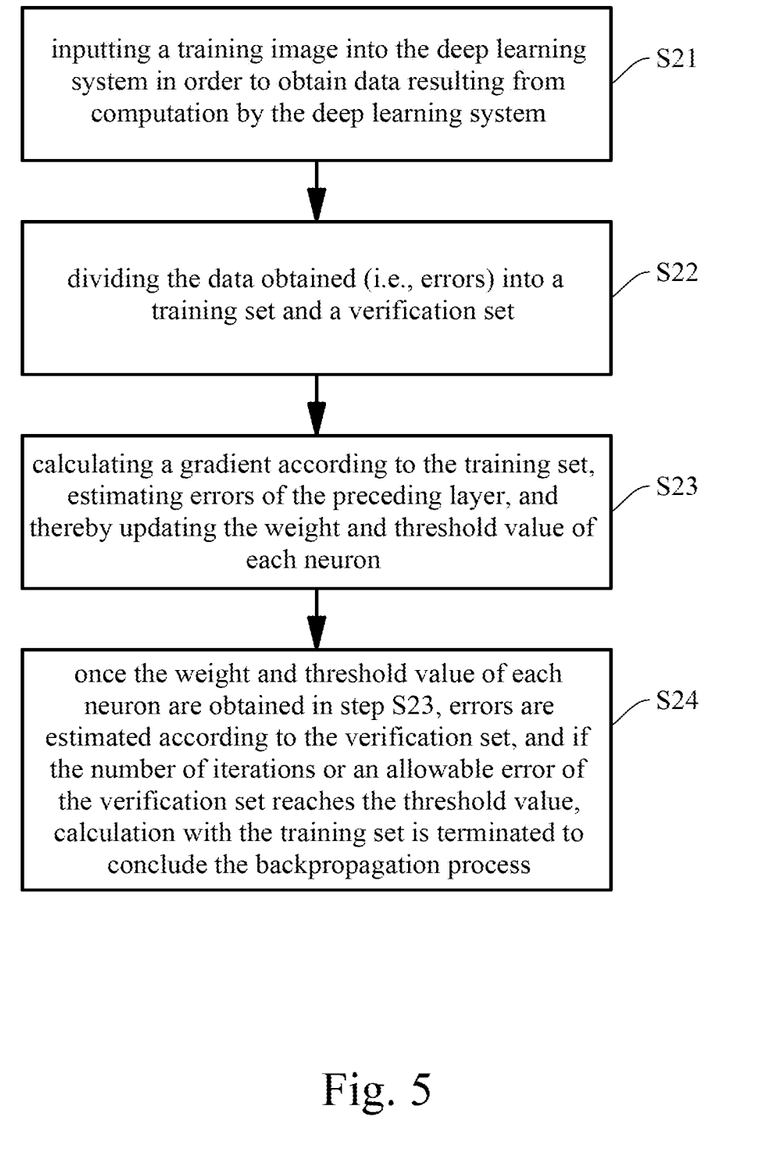
FIG. 5 is a flowchart of the backpropagation process.

FIG. 5 shows the flowchart of the backpropagation process, which includes the steps of: inputting a training image into the deep learning system in order to obtain data resulting from computation by the deep learning system (step S21); dividing the data obtained (i.e., errors) into a training set and a verification set (step S22); and calculating a gradient according to the training set, estimating errors of the preceding layer, and thereby updating the weight and threshold value of each neuron (step S23), wherein once the weight and threshold value of each neuron are obtained in step S23, errors are estimated according to the verification set, and if the number of iterations or an allowable error of the verification set reaches the threshold value, calculation with the training set is terminated to conclude the back-propagation process (step S24).

The trained deep learning system in this embodiment was actually put to the test, and the test results show satisfactory defect identification accuracy rates. More specifically, the tests were conducted with PCBs, liquid crystal displays (LCDs), and FPC boards, and the accuracy rates of the inspection results were often higher than 98%, with the time required for inspecting a single image being shorter than 0.05 second in many instances. The test results demonstrate that the training apparatus of the present invention has helped the deep learning system achieve rather high accuracy rates and inspection efficiency.

As above, the present invention not only can increase the defect detection rate and accuracy rate of automated optical inspection effectively, but also provides an improved artificial neural network structure that enables a significant increase in inspection speed and hence improvement on the result and efficiency of defect detection.

While the present invention has been described in connection with certain exemplary embodiments, it is to be understood that the invention is not limited to the disclosed embodiments, but, on the contrary, intended to cover various modifications and equivalent arrangements included within the spirit and scope of the appended claims and equivalents thereof.

What is claimed is:

1. An automated optical inspection and classification apparatus based on a deep learning system, to be used to detect a defect of an object through an image of the object, the automated optical inspection and classification apparatus comprising:
a processor for executing the deep learning system after loading data from a storage unit, wherein the deep learning system includes:
an input layer for receiving and normalizing the image of the object into an input image;
a neural network layer group for extracting the input image and thereby obtaining a plurality of image features, wherein the neural network layer group includes at least one neural network sub-block layer and a max-pooling layer; and
a fully connected-layer group with at least one fully connected layer for performing weight-based classification and outputting an inspection result;
wherein the neural network sub-block layer includes: a first operational subset and a second operational subset that share a common input,
an element-wise (eltwise) layer for performing a residual-related operation on an output of the first operational subset and an output of the second operational subset, and
a rectified linear unit (ReLU) for performing a nonlinear operation on an output of the eltwise layer.

2. The automated optical inspection and classification apparatus of claim 1, wherein the first operational subset comprises a first convolutional neural unit, and the first convolutional neural unit comprises a convolutional layer for the feature extraction and a normalization layer for performing batch normalization on extracted features.

3. The automated optical inspection and classification apparatus of claim 2, wherein the second operational subset comprises two second convolutional neural units and a third convolutional neural unit; and each said second convolutional neural unit comprises a convolutional layer for feature extraction, a normalization layer for performing batch normalization on extracted features, and a ReLU for performing a nonlinear operation on normalized features.

4. The automated optical inspection and classification apparatus of claim 2, wherein the second operational subset comprises a second convolutional neural unit and a third convolutional neural unit; and the second convolutional neural unit comprises a convolutional layer for feature extraction, a normalization layer for performing batch normalization on extracted features, and a ReLU for performing a nonlinear operation on normalized features.

5. The automated optical inspection and classification apparatus of claim 1, wherein the first operational subset is an empty operand.

6. The automated optical inspection and classification apparatus of claim 5, wherein the second operational subset comprises two second convolutional neural units and a third convolutional neural unit; and each said second convolutional neural unit comprises a convolutional layer for feature extraction, a normalization layer for performing batch normalization on extracted features, and a ReLU for performing a nonlinear operation on normalized features.

7. The automated optical inspection and classification apparatus of claim 5, wherein the second operational subset comprises a second convolutional neural unit and a third convolutional neural unit; and the second convolutional neural unit comprises a convolutional layer for feature extraction, a normalization layer for performing batch normalization on extracted features, and a ReLU for performing a nonlinear operation on normalized features.

8. The automated optical inspection and classification apparatus of claim 1, wherein the eltwise layer serves to perform the operation of $H(X)=F(X)+X$, where: X is the output of the first operational subset, $F(X)$ is the output of the second operational subset, and $H(X)$ is the output of the eltwise layer.

9. The automated optical inspection and classification apparatus of claim 1, wherein the eltwise layer performs the operation of $H(X)=F(X)-X$, where: X is the output of the first operational subset, $F(X)$ is the output of the second operational subset, and $H(X)$ is the output of the eltwise layer.

10. The automated optical inspection and classification apparatus of claim 1, wherein the output of the fully connected-layer group includes a scratch classification result, a short-circuit classification result, a copper-exposure classification result, an indentation classification result, a foreign-matter classification result, an open-circuit classification result, and a defect-free classification result.

11. The automated optical inspection and classification apparatus of claim 1, wherein the output of the fully connected-layer group includes a lack-of-photo-spacer (PS) classification result, a sandy-foreign-matter classification result, a foreign-matter-on-film classification result, a foreign-matter-under-film classification result, and a defect-free classification result.

12. The automated optical inspection and classification apparatus of claim 1, wherein the output of the fully connected-layer group includes a small-board-defect classification result, a foreign-matter-on-finger classification result, a compression and bending damage classification result, a breakage classification result, a foreign-matter-on-pad classification result, a U-shaped-metal-surface classification result, and a defect-free classification result.

13. A training apparatus of a deep learning system including an automated optical inspection and classification apparatus of claim 1, comprising an automated visual inspection (AVI) device for inspecting an object and thereby generating a defect image and related defect information, wherein the related defect information includes a defect type and a defect location; wherein, the automated optical inspection and classification apparatus obtains a defect image from the AVI device and transmits the defect image to the deep learning system for training.

14. The training apparatus of claim 13, further comprising a camera coupled to the AVI device, wherein the camera is configured for taking an image of the object according to the defect image and the related defect information in order to enhance a defect feature in the defect image and thereby generate a defect-enhanced image, and transmitting the defect-enhanced image to the deep learning system for training.

* * * * *